United States Patent [19]

Estes

[11] 4,149,178
[45] Apr. 10, 1979

[54] PATTERN GENERATING SYSTEM AND METHOD

[75] Inventor: Earl M. Estes, Canon City, Colo.

[73] Assignee: American Technology Corporation, Canon City, Colo.

[21] Appl. No.: 729,736

[22] Filed: Oct. 5, 1976

[51] Int. Cl.² .................... H04N 9/62; H04N 7/02
[52] U.S. Cl. ....................................... 358/10; 358/139
[58] Field of Search ............... 358/10, 139; 328/187, 328/188

[56] References Cited

U.S. PATENT DOCUMENTS

| | | | |
|---|---|---|---|
| 2,877,291 | 3/1959 | Bernard et al. | 358/10 |
| 2,995,666 | 8/1961 | Wood | 307/216 X |
| 3,019,289 | 1/1962 | Machlis | 358/139 X |
| 3,590,149 | 6/1971 | Harshbarger | 358/139 |
| 3,879,749 | 4/1975 | Baum | 358/139 X |
| 3,917,902 | 11/1975 | Olson | 358/10 X |
| 3,984,862 | 10/1976 | Volz | 358/139 |
| 4,023,110 | 5/1977 | Oliver | 307/293 X |

OTHER PUBLICATIONS

Color Generators Reach the Solid State, F. H. Belt, Electronics World, May 1968, pp. 25-29, 64-65.

Primary Examiner—Robert L. Griffin
Assistant Examiner—Aristotelis M. Psitos
Attorney, Agent, or Firm—O'Rourke & Harris

[57] ABSTRACT

A pattern or test signal generating system and method is disclosed that is particularly well suited for servicing of T.V. receivers and the like. The system provides a series of individually selectable outputs that are utilized to produce patterns on the image-producing device of a unit to be serviced, including a COLOR QUAD pattern, a GRAY QUAD pattern, and a HATCHDOTS pattern. The system is lightweight and portable yet provides the plurality of outputs which enhance out-of-shop servicing of T.V. receivers. By the addition of the QUAD and HATCHDOTS patterns, the capability and versatility of the system is increased particularly for testing and adjusting color television receivers, closed-circuit monitors and the like. A system modification is also disclosed for providing an NTSC type color bar pattern.

33 Claims, 12 Drawing Figures

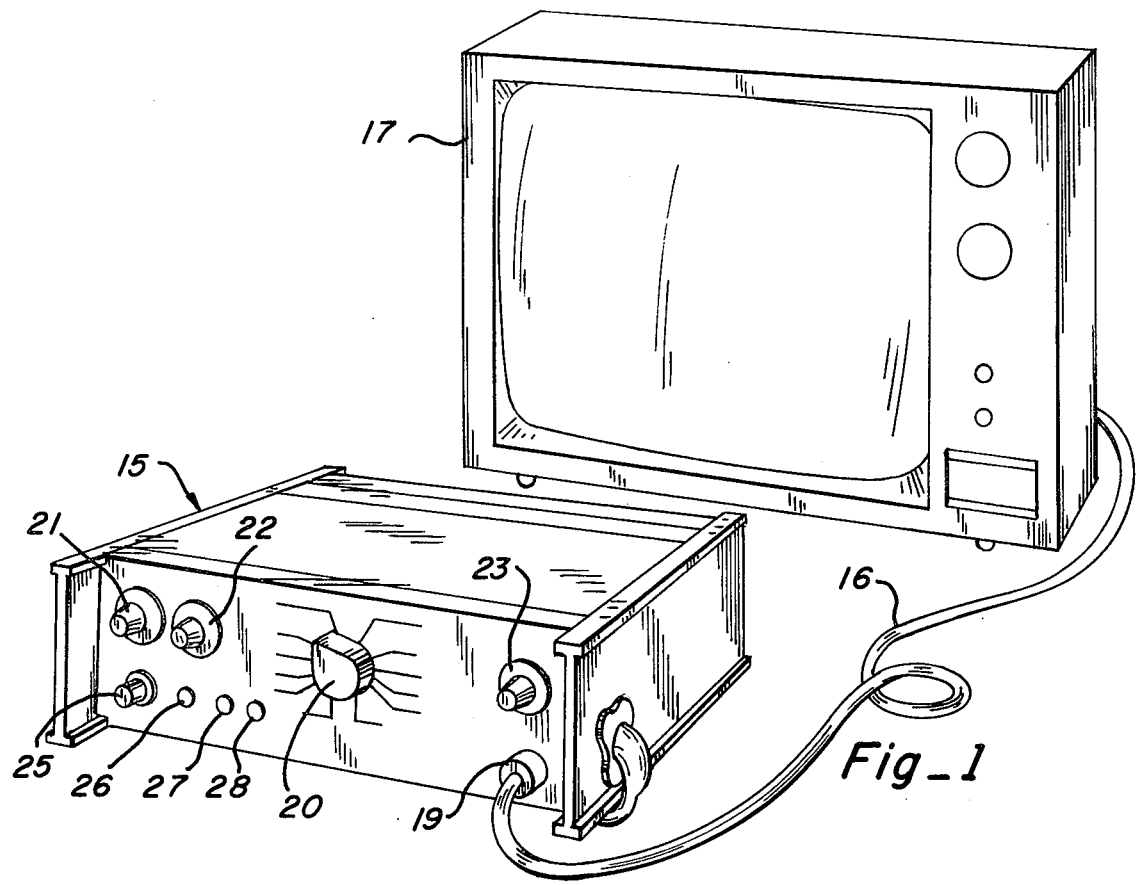
Fig_1
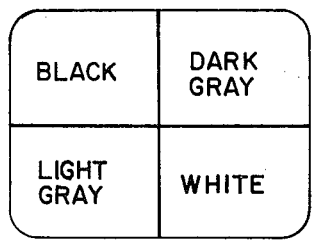
GRAY QUAD
Fig_9
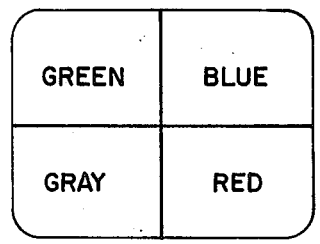
COLOR QUAD
Fig_8
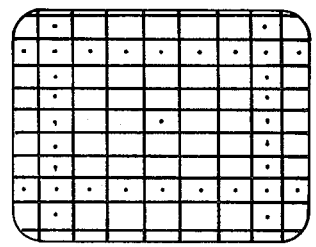
HATCHDOTS
Fig_10
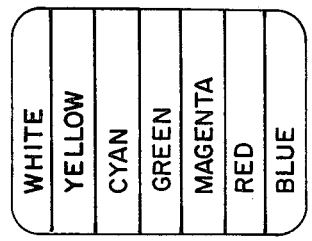
COLOR BARS
Fig_12

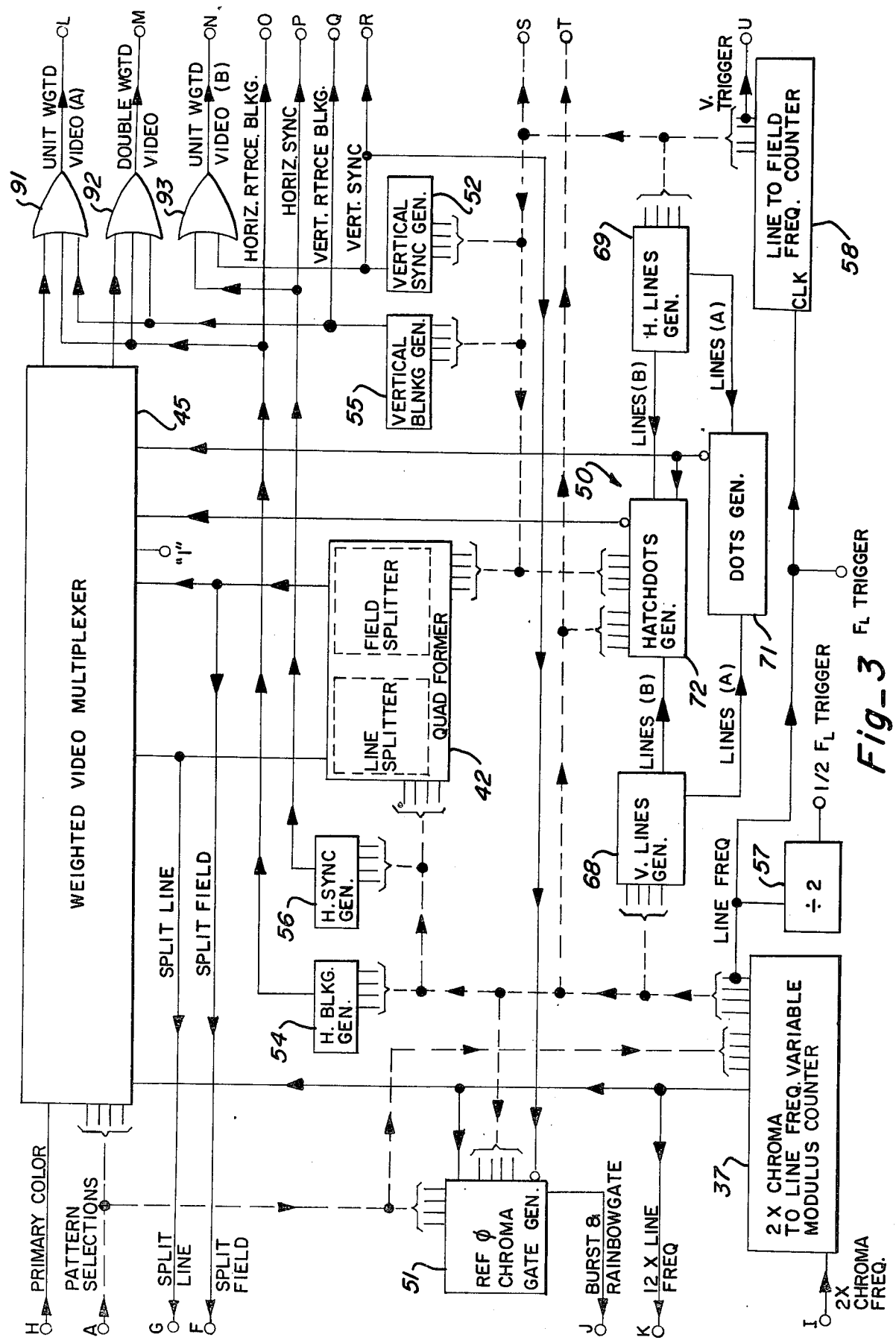
Fig_3

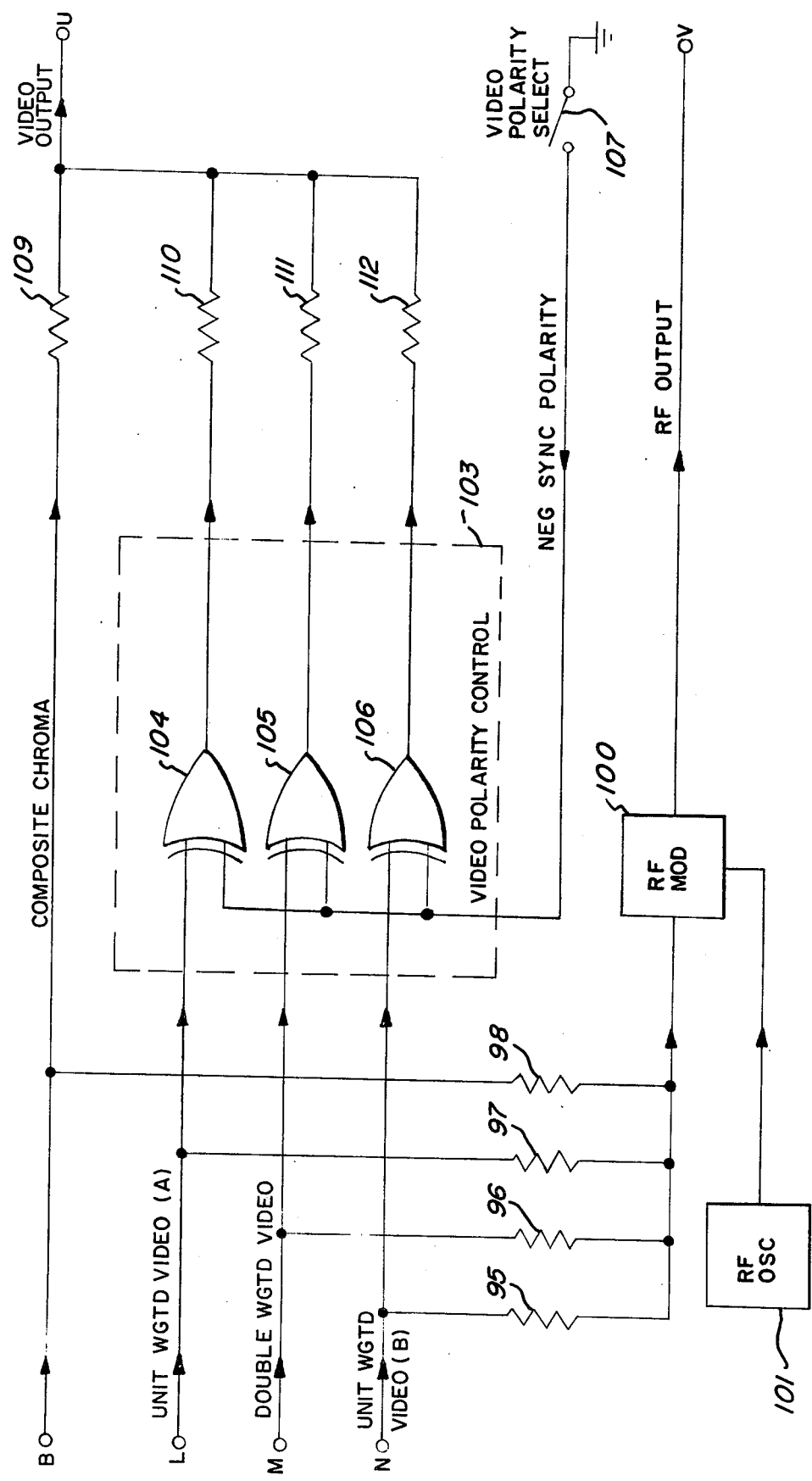
Fig_4

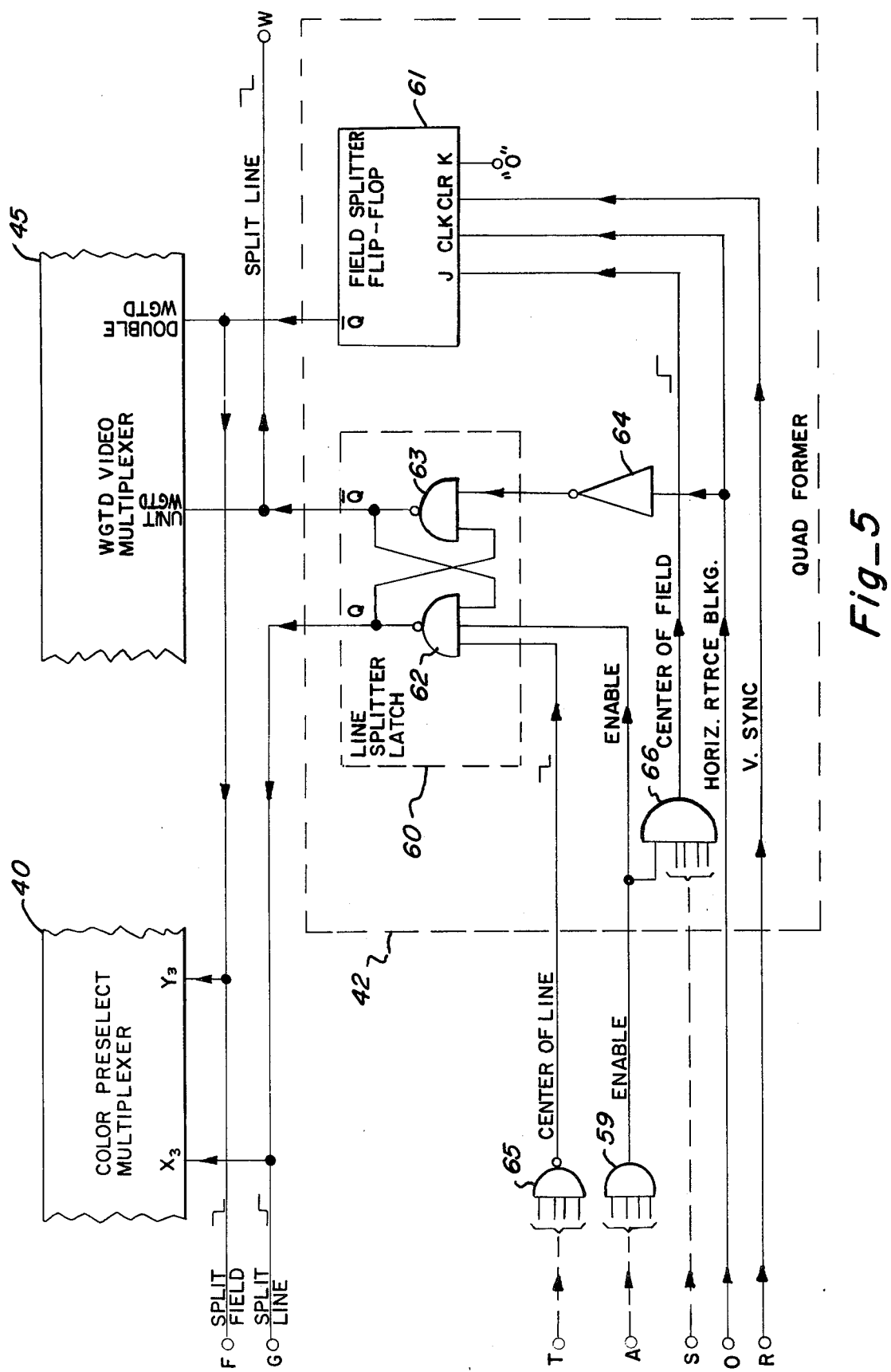
Fig_5

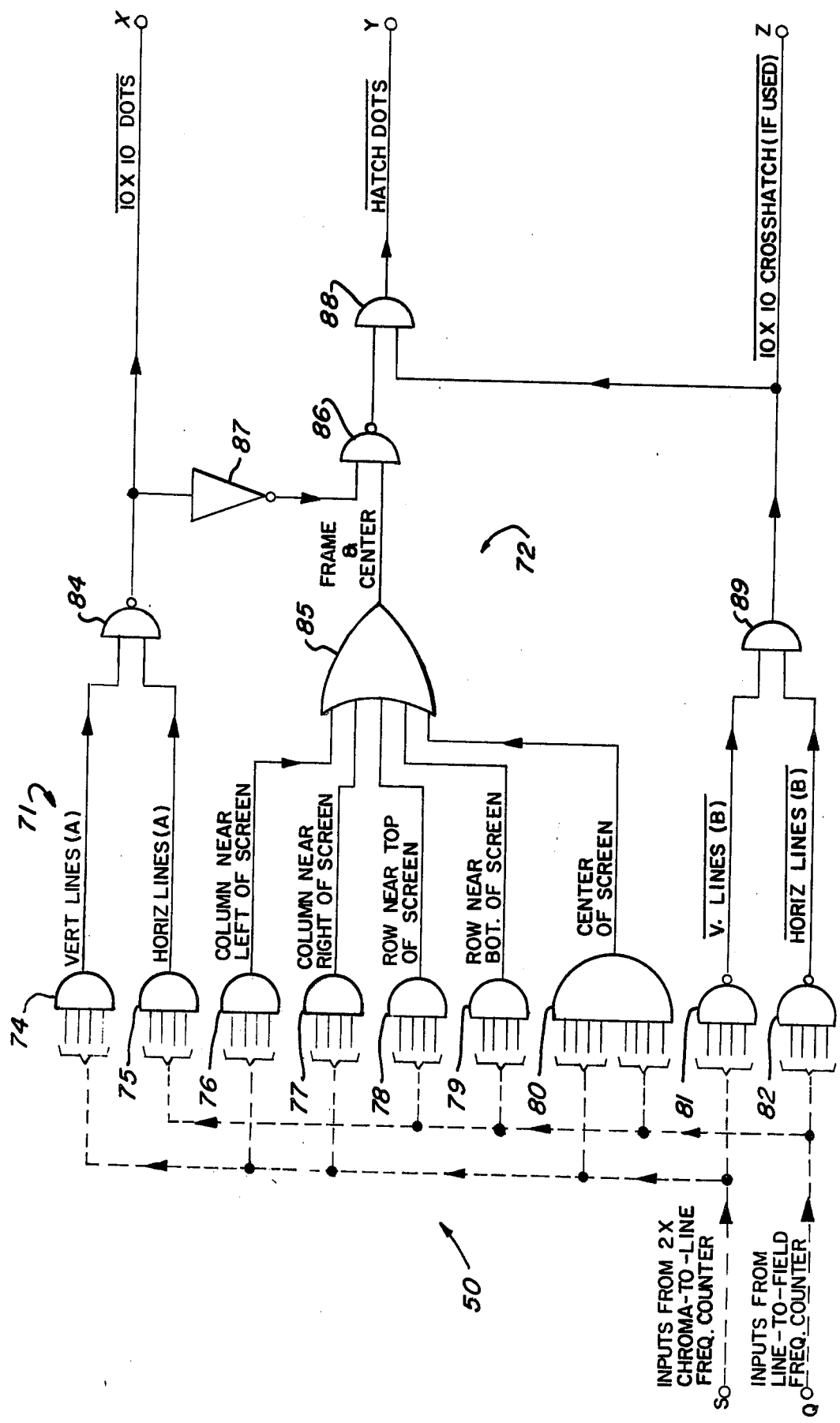

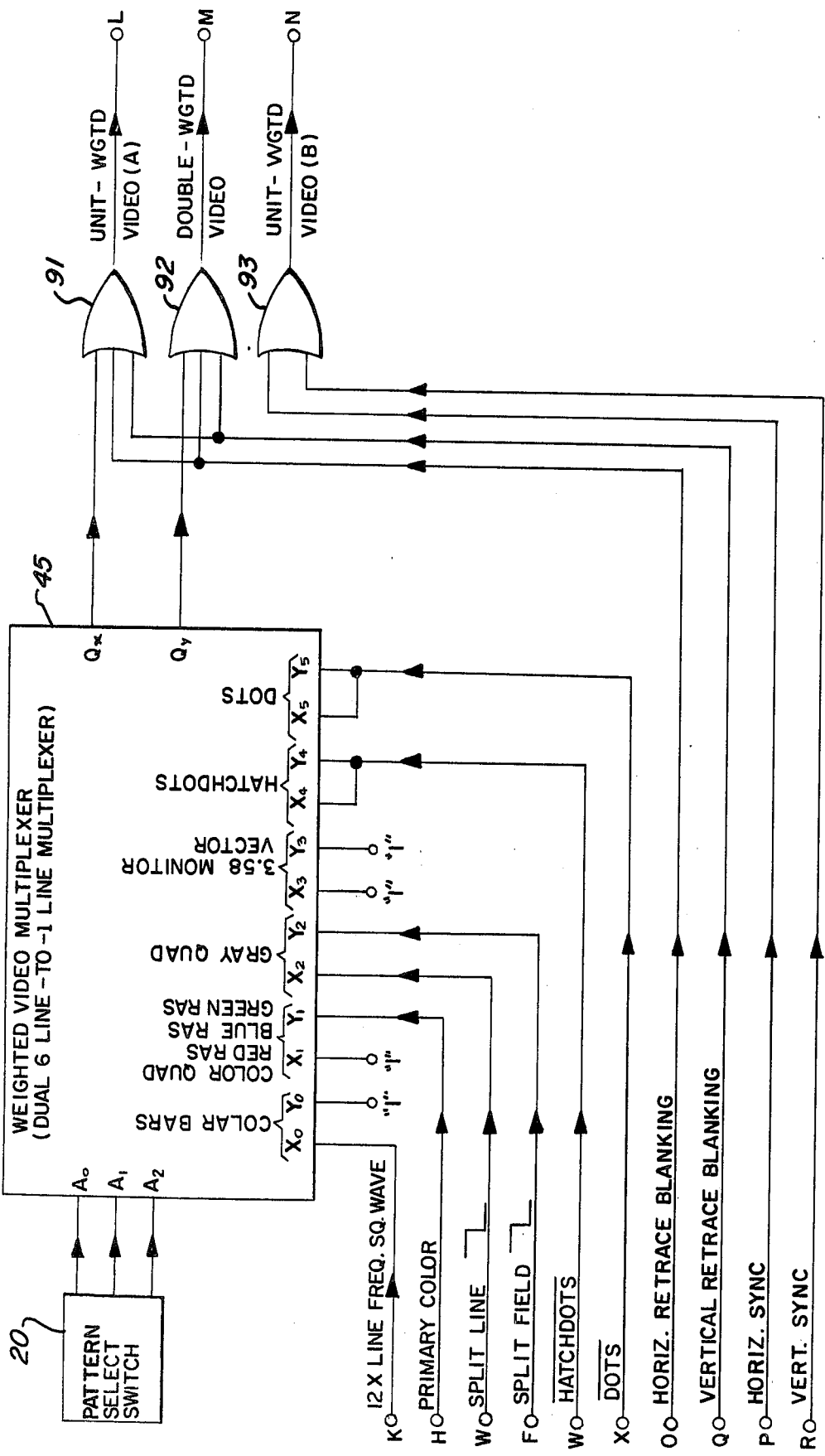
Fig_7

PATTERN GENERATING SYSTEM AND METHOD

RELATED APPLICATION

This application relates to my copending U.S. Pat. Application Ser. No. 677,196, filed Apr. 15, 1976 and entitled "Test Signal Generating System and Method" and now U.S. Pat. No. 4,093,960.

FIELD OF THE INVENTION

This invention relates to a pattern generating system and method and, more particularly, relates to a system and method for producing patterns useful in servicing T.V. receivers and the like.

BACKGROUND OF THE INVENTION

As electronic equipment, have become more complicated, it has been necessary to provide units to facilitate, or in some cases make possible, the servicing of such electronic equipment to keep the same in good operational condition. This has been particularly true of electronic equipment used to receive T.V. signals, including the now common T.V. receiver and closed-circuit T.V. monitor, and the need for such service equipment has become even more acute with the increased use of color T.V. receivers and monitors.

Servicing of television receivers and closed-circuit T.V. monitors, and particularly color television receivers, often requires the use of special signal generating apparatus for producing stable test patterns such as a plurality of color bars each of different hue, a crosshatch pattern of white vertical and horizontal lines, or an orderly array of white dots to be displayed on the image-producing device of the T.V. receiver or closed-circuit monitor.

These patterns are useful for checking and correctly adjusting linearity and pincushion distortions in scanning circuits, for checking and correctly adjusting operation of electron beam convergence, and for checking and adjusting color phasing and matrixing circuits in color television receivers.

While the need for more complex servicing equipment exists in view of the more complicated electronic equipment to be serviced, there obviously also exists a need to minimize such complexity to the extent possible in view of the seemingly ever increasing needed functions. To this end, it is desirable that servicing equipment be, and be maintained, lightweight, portable, reliable, versatile, and yet capable of simple operation.

Servicing equipment for T.V. receivers have been heretofore suggested and/or utilized. Included among such known equipment is equipment generally directed to producing test patterns for servicing T.V. receivers, and some said suggested equipment has included such features as digital circuitry, color bar pattern generation, and dot and crosshatch generation, as well as various frequency divider systems. Among patents showing one or mre of these features are U.S. Pat. Nos. 3,019,289; 3,529,079; 3,250,853; 3,188,383; 2,836,717; 3,493,673; 3,430,067; 2,975,229; 3,634,612; 2,943,144; 3,586,755; 3,334,178; 2,824,225; and 2,683,187.

Such servicing equipment now suggested and/or utilized has not, however, proved to be completely successful at least in accomplishing all of many and diverse desired ends. For example, known servicing equipment, while providing test patterns, has not provided fully satisfactory patterns and/or has not produced the number of various patterns that might be needed. In accordance, known servicing equipment has not fully provided needed simplicity, versatility and/or reliability, and circuitry problems related to such equipments have not been eliminated or satisfactorily reduced in many instances.

Thus, even though much servicing equipment has been heretofore suggested and/or utilized, a need still existed for a system that could eliminate, or at leat substantially reduce, many of the problems in equipment of this type.

In my above-referenced copending U.S. Pat. Application Ser. No. 677,196, I have described and claimed an improved system and method for generating test signals for servicing a T.V. receiver and the like which has the capability of producing a number of test patterns that were unobtainable prior to my invention. This invention expands upon my previous invention and provides a further improvement in the system and method as well as providing more test patterns that have been heretofore not available and yet are useful in servicing of T.V. receivers and the like.

SUMMARY OF THE INVENTION

This invention provides an improved lightweight and portable pattern generating equipment that is reliable, versatile, and yet simple to operate with said equipment being particularly well suited for servicing of T.V. receivers and monitors including color equipment. This invention provides an improvement in available patterns, as well as a method for producing such patterns for servicing of T.V. receivers and the like.

It is therefore an object of this invention to provide an improved system and method for producing patterns suitable for servicing of electronic equipment such as T.V. receivers.

It is another object of this invention to provide an improved system for controlling the polarity of output signals utilized for causing test patterns to be produced for use in servicing T.V. receivers and the like.

It is yet another object of this invention to provide a system having improved circuitry utilizing a digital technique for controlling the phase of chroma output signals.

It is still another object of this invention to provide a system capable of producing a GRAY QUAD pattern for checking and adjusting the video and display circuits of a T.V. receiver.

It is yet another object of this invention to provide a system capable of producing a COLOR QUAD pattern for checking and adjusting the chroma and display circuits in a T.V. receiver or monitor.

It is still another object of this invention to provide a system capable of providing a HATCHDOTS pattern that has improved versatility for making beam convergence, linearity, and pincushion checks and adjustments in addition to checks of video peaking.

It is yet another object of this invention to provide a system having an output trigger to enable chroma cycles to be externally viewed as, for example, on a single trace oscilloscope using a color bar pattern generator with chroma frequency phase locked at an odd harmonic of one-half the line frequency.

It is still another object of this invention to provide an improved system for producing patterns suitable for servicing of an electronic unit having an image display device with the system including mutiplexer means utilized in forming said pattern.

With these and other objects in view, which will become apparent to one skilled in the art as the description proceeds, this invention resides in the novel construction, combination, method, and arrangement of parts substantially as hereinafter described, and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate complete embodiments of the invention according to the best mode so far devised for the practical application of the principles thereof, and in which:

FIG. 1 is a perspective view of the test signal generating system of this invention shown connected to a conventional T.V. receiver for servicing of the same;

FIGS. 2 through 4, taken together, constitute an electrical functional block diagram of the test signal generating system of this invention as shown in FIG. 1;

FIG. 5 is a functional block diagram relating to the quad former unit shown in FIG. 3;

FIG. 6 is a functional block diagram relating to the DOTS, HATCHDOTS, and CROSSHATCH pattern generating circuitry;

FIG. 7 is a functional block diagram relating to the weighted video multiplexer section shown in FIG. 3;

FIG. 8 is a color quad pattern that may be produced on a T.V. receiver connected with the test signal generating system of this invention;

FIG. 9 is a gray quad pattern that may be produced on a T.V. receiver connected with the test signal generating system of this invention;

FIG. 10 is a HATCHDOTS pattern that may be produced on a T.V. receiver connected with the signal generating system of this invention;

FIG. 12 is a color bar pattern that may be produced on a T.V. receiver connected with the test signal generating system of this invention as modified and shown in FIG. 11.

DETAILED DESCRIPTION OF THE INVENTION

Figure 2:
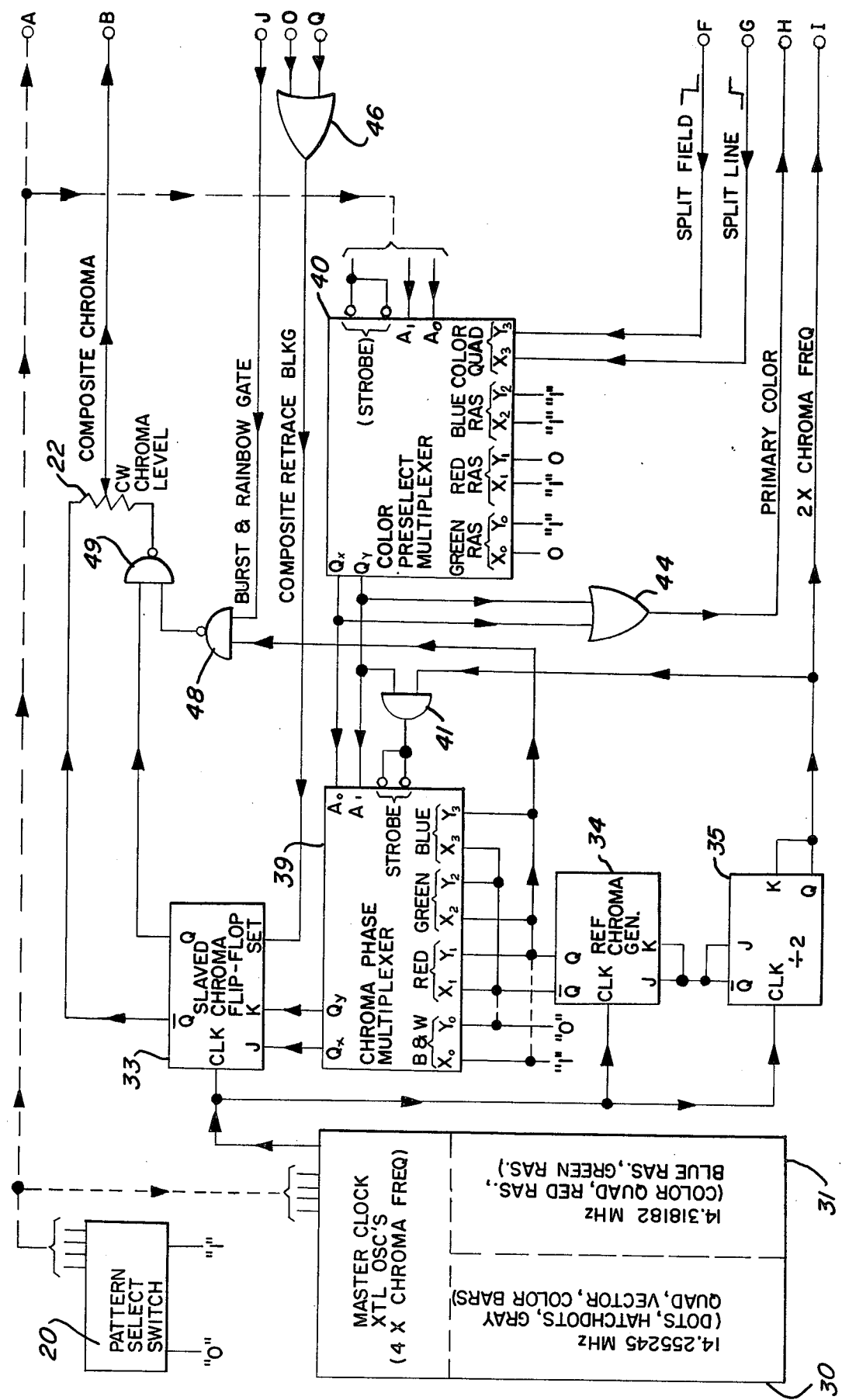

Referring now to the drawings, FIG. 1 shows the test signal generating system 15 of this invention connected typically, as by lead 16, with a conventional electronic unit (shown as T.V. receiver 17) having an image-producing, or display, device (shown as a T.V. tube) upon which appears test patterns under the control and by selection of signal generating system 15. As indicated in FIG. 1, signal generating system 15 has a plurality of controls and jacks at the front face thereof with plug 19, connected with lead 16, being shown inserted into a jack (not shown) at the lower right portion of the front face of unit 15. Pattern select switch 20 is preferably centrally located on the front face of unit 15, video level control switch 21 and chroma level control switch 22 are preferably located at the top left side of the front face, and RF/IF — volume control switch 23 is preferably located at the top right side of the front face of unit 15. Switches 21 through 23 are preferably of the push-pull type and also rotatable switches with the rotatable portion controlling the level of signal and the push-pull portion controlling the type of signal (i.e., negative or positive video for switch 21, interlace or non-interlace for switch 22, and RF or IF for switch 23).

A plurality of jacks 25 through 28 are also located at the lower left portion of the face of unit 15 with jack 25 being a video output jack, jack 26 being a vertical trigger jack, jack 27 being a ½ line frequency trigger jack, and jack 28 being a line frequency trigger jack.

FIGS. 2 through 4, taken together, constitute an electrical functional block diagram of unit, or system, 15, while FIGS. 5 through 7 show particular portions of elements depicted in FIG. 3 in more detail. As indicated in the drawings, the components, or elements, utilized are preferably solid state digital logic elements and the system of this invention can thus be packaged in a relatively small and thus portable unit as indicated in FIG. 1.

Unit 15 is similar, in many respects, to the signal generating system as set forth in my copending U.S. Pat. application, Ser. No. 677,196, which reference may be made for the details thereof.

In the FIGURES illustrating the invention by functional block diagram, where the name of a function is indicated, it is implied to be a "1" level (standard logic) unless a line appears above the name or a circle appears at the point where the connection is made, both of which indicate that it is a NOT (inverted) function. Where several outputs from a counter or switch are bracketed together and are connected via a dashed line to one or more other blocks or elements, this is an indication that one or more of the outputs are used by the respective block in order to provide an appropriate input for the task to be accomplished. Being for illustrative purposes, there is not meant to be an implication in this situation that the number of outputs shown from the generating subsystem or the number of inputs shown to the receiving subsystem are indicative of the actual number that are used. Thus, each may consist of several sub-parts and one or more of these sub-parts may also serve a dual purpose as part of another subsystem, as would be obvious to one skilled in the art. A typical example is pattern select switch 20 and the manner by which this switch supplies control inputs to the color preselect multiplexer 40. The select switch, as illustrated in FIG. 1, could be a 12 position rotary selector switch. A switch of this type can be readily wired, as would be obvious to one skilled in the art, to produce three lines of binary pattern select data to a circuit element such as the color preselect multiplexer 40 of the weighted multiplexer 45 as shown in FIG. 2 of the drawings to produce the proper outputs as set forth in Table I, which table illustrates the respective address inputs to the color preselect multiplexer.

As shown in FIG. 2, two master clock oscillators 30 and 31 are employed, but only one is enabled for any specified test condition. Crystal oscillators 30 and 31 may be conventional and are coupled to the three flip-fops 33, 34 and 35 in such a manner that either oscillator (whichever is enabled) acts as a suitable clock for these flip-flops. With RED RASTER. BLUE RASTER, GREEN RASTER, or COLOR QUAD selected, the 14.318182 MHz oscillator 31 (four times the required 3.579545 MHz chroma (frequency) is enabled, whereas, with COLOR BARS, 3.58 MONITOR, or VECTOR selected, the 14.255245 MHz oscillator 30 (four times the required 3.563811 MHz offset carrier) is enabled. With any black and white pattern, GRAY QUAD, HATCHDOTS, or DOTS selected, either clock frequency can be used providing it is consistent with the counting modulus selected.

A 2×chroma-to-line frequency variable modulus counter 37, receiving the output from flip-flop 35, is illustrated in FIG. 3, but a conventional separate oscillator and fixed modulus counter could be used if increased interference levels and reduced versatility are tolerable, and if there is no requirement for a ½ line frequency oscilloscope trigger. When a synchronous countdown from 2×chroma-to-line frequency is employed, as illustrated, the counting modulus must be made compatible with the selection of master clock oscillator, i.e., with a 14.318182 MHz master clock oscillator 31 and a required line scanning frequency of 15.734265 KHz, the 2×chroma-to-line frequency modulus must be 455, etc.

The subsystem set forth in FIG. 2 for producing the three primary colors is similar to the system set forth in my copending U.S. Patent Application Ser. No. 677,196 which produces a single primary color raster. The subsystem as depicted in FIG. 2 of this application, however, has the capability of producing all of three primary colors individually and collectively (as a COLOR QUAD pattern) under the control of a simple switch selection. To this end, the unit of this invention employs a pair of cascaded dual-channel multiplexers, 39 and 40, an AND gate 41, and a quad former 42 (as illustrated in FIGS. 3 and 6). Multiplexers 39 and 40 may be conventional, and may be, for example, dual 4 input multiplexers designated as 74153. The multiplexers designated as 74153 and of the 7400 series are commercially available and may be obtained, for example, from Texas Instruments, Incorporated or other semiconductor manufacturer.

Referring again to FIG. 2, divide-by-two (÷2) flip-flop 35 divides the clock frequency by two to produce the 2×chroma frequency output which produces synchronizing inputs to chroma reference generator flip-flop 34 and to AND gate 41. Chroma reference generator 34 provides further division by two to produce the chroma reference frequency. Flip-flop 34 is slaved to flip-flop 35 and is synchronized with the clock which also synchronizes flip-flop 33. This enables flip-flops 33 and 34 to generate chroma signals having accurately controlled phase relationships of 0, 90, 180, or 270 degrees providing the proper steering signals are supplied to the J and K inputs of flip-flop 33. It should be noted that 0, 90, 180, and 270 degree phase relationships correspond to green (G-Y) red (R-Y), blue (B-Y), and cyan -(R-y), respectively.

As illustrated in FIG. 2, gray (flip-flop 33 in a static condition) is preferably substituted for the cyan that would be produced if the $X_0$ and $Y_0$ inputs of the chroma phase multiplexer 39, were connected to the $\overline{Q}$ and Q outputs of flip-flop 34 respectively, as indicated in dotted lines in FIG. 2.

Assuming the most simple case (RED RASTER selected by pattern select switch 20), the $\overline{STROBE}$, $A_1$ and $A_0$ inputs to the color preselect dual multiplexer 40 are 0, 0, 1, respectively, as shown in the following pattern select truth table:

TABLE I

| Pattern Select Truth Table | | | |
|---|---|---|---|
| PATTERN | $\overline{ST}$ | $A_1$ | $A_0$ |
| GREEN RASTER | 0 | 0 | 0 |
| RED RASTER | 0 | 0 | 1 |
| BLUE RASTER | 0 | 1 | 0 |

TABLE I-continued

| Pattern Select Truth Table | | | |
|---|---|---|---|
| PATTERN | $\overline{ST}$ | $A_1$ | $A_0$ |
| COLOR QUAD | 0 | 1 | 1 |
| ALL OTHERS | 1 | X | X |

This causes the $X_1$ and $Y_1$ inputs to this preselect multiplexer to be addressed resulting in a "1" and a "0" appearing at the $Q_x$ and $Q_y$ outputs, respectively. The "1" from $Q_x$ causes OR gate 44 to supply a "1" to the $Y_1$ input to the weighted video multiplexer 45 (illustrated in FIGS. 3 and 7) to indicate that a primary color is being produced. Multiplexer 45 may be conventional and may be, for example, two eight input multiplexers of the 7400 series.

The "0" output from $Q_y$ of the color preselect multiplexer 40 appears at the $\overline{STROBE}$ input to the chroma phase multiplexer 39 to be enabled. The "1" and "0", respectively, which appear at the $A_0$ and $A_1$ inputs to the chroma phase multiplexer 39 cause the $X_1$ and $Y_1$ inputs to be addressed. This causes the chroma phase multiplexer to pass the $\overline{Q}$ and Q outputs of the reference chroma generator 34, to the J and K inputs, respectively, of the slaved chroma flip-flop 33.

It can be seen from the foregoing that the $\overline{Q}$ and Q outputs of the slaved chroma flip-flop 33 lag in phase the Q and $\overline{Q}$ outputs, respectively, of the reference chroma generator 34 by exactly one clock cycle. In this example, these flip-flops can be thought of as two successive stages of a shift register. It should be noted that, since the clock frequency is exactly four times the chroma frequency, the phase lag between these two flip-flops is exactly 90 degrees at the chroma frequency, i.e. they operate in quadrature producing an R-Y output.

Assuming now a slightly more difficult case (BLUE RASTER selected), 0, 1, 0 appears at the respective $\overline{STROBE}$, $A_1$ and $A_0$ inputs of the color preselect multiplexer causing the $X_2$ and $Y_2$ inputs to be addressed and "1's" to appear at both $Q_x$ and $Q_y$. The "1" output of $Q_y$ again causes OR gate 44 to indicate that a primary color is being produced. The "1" from $Q_y$ also appears at an input of AND gate 41 allowing the Q output of flip-flop 35 to control the $\overline{STROBE}$ input to the chroma phase multiplexer 39. The "1" inputs to both $A_0$ and $A_1$ of the chroma phase multiplexer address the $X_3$ and $Y_3$ inputs. It can be seen from this that, if it were not for the additional delay introduced by the $\overline{STROBE}$ input, a red raster would be produced since the operation would be identical to the case analyzed above with RED RASTER selected (note that the $X_3$ and $Y_3$ inputs correspond exactly with the $X_1$ and $Y_1$ inputs, respectively).

An additional clock cycle of delay is introduced by the Q output of flip-flop 35 which appears via AND gate 41 at the $\overline{STROBE}$ input to the chroma phase multiplexer 39. This results from the fact that the same clock cycle which causes the reference chroma generator to change state also causes the Q output of flip-flop 35 to transfer to the "1" state. This disables the chroma phase multiplexer causing "0's" to appear at both its $Q_x$ and $Q_y$ outputs, thus placing the slaved chroma flip-flop 33 in its "hold" state. On the next clock cycle (90 degrees phase delay), the chroma phase multiplexer is again enabled when the Q output of flip-flop 35 transfers to the "0" state causing the $\overline{Q}$ and Q outputs of the reference chroma generator to appear at the J and K inputs of the slaved chroma flip-flop 33. On the next clock cycle (180 degrees phase delay), the state of the outputs of the slaved chroma flip-flop 33 will transfer. A blue (B-Y) chroma output is produced by this 180 degree phase delay from the reference (burst) signal.

The GREEN RASTER pattern (360 degrees phase delay from burst) is produced in the same manner as the BLUE RASTER pattern (180 degrees phase delay) except that an additional 180 degrees phase shift is introduced by reversing the phase of the $X_2$ and $Y_2$ inputs to the chroma phase multiplexer 39 as compared to the respective phases of the $X_3$ and $Y_3$ inputs.

With the COLOR QUAD pattern selected by pattern select switch 20, the STROBE, $A_1$ and $A_2$ inputs to the color preselect multiplexer are 0, 1, 1, respectively. The preselector is thereby enabled and the $X_3$ and $Y_3$ inputs are addressed. This causes the split line and split field outputs of the quad former subsystem 42 to appear at $Q_x$ and $Q_y$ outputs, respectively, of the color preselect multiplexer. The field and line splitter waveforms shown at the F and G inputs to FIG. 2 are seen to transfer from "1" to "0" in the center of the field and from "0" to "1" in the center of a line, respectively. Since a TV scans the field from top to bottom of the screen and the lines from left to right, it can be seen that these field and line splitting waveforms are "1" and "0", respectively, in the upper left quadrant since both scans are just starting out. It can be seen from this that a "0" and a "1" appear at the respective $X_3$ and $Y_3$ inputs to the color preselect multiplexer thus causing a "0" and a "1" to appear at the $Q_x$ and $Q_y$ outputs, respectively. This "0" and "1" appear at the $A_0$ and $A_1$ inputs, respectively, of the chroma phase multiplexer thus addressing the $X_2$ and $Y_2$ (green) inputs. It can be seen from this that the upper left quadrant of the T.V. screen will therefore be green and an extension of this analyses will show that the upper right quadrant will be blue and that the lower right quadrant will be red, as indicated in FIG. 8.

During scanning of the lower left quadrant of the T.V. screen, the split line and split field inputs arriving at $X_3$ and $Y_3$ of the color preselect multiplexer are both "0's" and these "0's" therefore appear at the $Q_x$ and $Q_y$ outputs. These "0's" arriving at the $A_0$ and $A_1$ inputs of the chroma phase multiplexer 39 cause the $X_0$ and $Y_0$ (black and white) inputs to be addressed. The "1" and "0" at the $X_0$ and $Y_0$ inputs, respectively, therefore appear at the $Q_x$ and $Q_y$ outputs. This "1" and "0" thus appear at the J and K inputs, respectively, of the slaved chroma flip-flop 33, causing its Q output to hold in the "1" state. It can be seen from this that no chroma is produced in the lower left quadrant as shown in FIG. 8.

A study of the video multiplexer/matrixing subsystem will show that the lower left quadrant is light gray. Note that if the $X_0$ and $Y_0$ inputs to the chroma phase multiplexer were alternately connected to the Q and $\overline{Q}$ outputs, respectively, of the reference chroma generator 34, a chroma signal would be produced in the lower left quadrant of the T.V. screen. Since this chroma signal would be out of phase with the red chroma signal ($X_1$ and $Y_1$ inputs) it would be -(R-Y) which is cyan.

During retrace of the vertical and horizontal scanning subsystems in the T.V., the slaved chroma flip-flop 33 is disabled by the composite retrace blanking output of OR gate 46 causing the Q output of the slaved chroma flip-flop 33 to hold in the "1" state.

When any color pattern is selected, a burst gate signal (the burst portion of the burst and rainbow gate) arrives at an input to NAND gate 48, enabling it to pass a sample of the reference chroma signal to the CHROMA LEVEL control 22 through NAND gate 49. This burst is generated during the "back porch" interval which follows the horizontal sync pulse and is used by the AFPC (automatic frequency and phase control) circuit in the T.V. to synchronize the color sync oscillator.

With either gated rainbow pattern (COLOR BARS or VECTOR) selected, a composite burst and rainbow gate signal arrives at NAND gate 48 to gate the 3.563811 MHz offset carrier, whereas with 3.58 MONITOR selected the burst is deleted in order to make the color sync oscillator in the T.V. free-run as described in my copending U.S. Patent Application Ser. No. 677,196. Note that the offset carrier is generated by the reference chroma generator 34. It is one-fourth the frequency of the 14.255245 MHz master clock oscillator 30, and is used as a chroma signal for producing the familiar gated rainbow patterns. This 3.563811 MHz chromas signal is "offset" by an amount exactly equal to the 15.734265 KHz line scanning frequency.

It might also be noted that, with the slaved chroma flip-flop 33 in its hold state, a "0" from its $\overline{Q}$ output clamps the CCW end of the CHROMA LEVEL control to ground and enables the control to adjust the level of the gated rainbow, 3.58 MONITOR, and color burst signals. When a primary color is being produced, however, identical chroma signals arrive in phase at both the CW and CCW ends of the CHROMA LEVEL control. Through this highly effective and low cost method of combining the burst and primary color chroma signals it is possible to adjust the relationship of their amplitudes in such a manner (primary color signals greater amplitude than burst signals) that highly saturated colors are produced. This feature is extremely useful in checking the bandpass amplifier and automatic chroma control circuits, and in comparing the dynamic range of the separate electron guns in the picture tube, and also in checking and adjusting color purity.

In FIG. 3, the interrelationships of the various timing place control subsystems are depicted with little detail being included relative to the internal composition of these blocks illustrating conventional subject matter, since such blocks, as well as the interfaces therebetween, are thought to be well known and self explanatory. The blocks illustrated as quad former 42, weighted video multiplexer 45, and HATCHDOTS subsystem 50, have, however been presented in greater detail in FIGS. 6 through 8.

Wherever a dashed line appears in the drawings, in place of a conductor, it is used to represent a data bus with unspecified number of conductors. Data flows over the bus from a generating source such as the pattern selector switch or a counter and is received by the various subsystems. Data flow is in the direction indicated by the arrows, and there is no implication that the number of lines used is equal to the number shown leaving the generator or arriving at the receiver. In all cases, data bus or single conductor, the arrows indicate the direction of data flow (not current flow).

Referring to FIG. 3, the reference phase chroma gate generator 51 can be seen to receive data from the pattern selector switch 20, the 2×chroma-to-line frequency variable modulus counter 37, and the vertical sync generator 52. Actually, two inputs are shown from counter 37, one of which is specified to be 12 times the line frequency. The burst and rainbow gate outputs consist of a burst gate which follows the horizontal sync pulse during the horizontal blanking interval and/or 10 rainbow pattern gates, each 15 degrees wide with 15 degree interpulse spacing. The significance of the 12×line frequency square wave is that it spaces the color bars at 30 degree (360/12) intervals to produce the familiar gated rainbow pattern. The most simple implementation for the reference phase chroma gate generator uses some NAND gates, but other configurations are possible. It should be noted that the vertical sync is applied as an inhibit (NOT) input and, therefore, no color burst is generated when the vertical sync is present.

The horizontal blanking generator 54 and the vertical blanking generator 55 generate retrace blanking outputs that override the weighted video multiplexer outputs and blank the respective beam retrace lines in the conventional manner by producing the black level during these respective intervals.

The horizontal sync generator 56 and the vertical sync generator 52 produce these respective functions in the conventional manner. These occur during the respective retrace intervals (black level as described above) and are summed with the black level to produce the blacker-than-black (sync) level video output.

As shown in FIG. 3, the line frequency output from counter 37 is coupled by a divide-by-two circuit 57 to supply a ½ line frequency trigger output, with the output from counter 37 also being coupled to line-to-field frequency counter 58 which provides outputs to quad former 42 and a vertical trigger output.

FIG. 3 also shows the quad former subsystem 42 in brief form to illustrate its interfaces with other subsystems. The purpose of the quad former is to produce outputs which divide the T.V. screen into four equal quadrants as required to produce the GRAY QUAD and COLOR QUAD patterns as shown respectively in FIGS. 9 and 8.

The quad former subsystem 42 is set forth in greater detail in FIG. 5. As shown in FIG. 5, AND gate 59 receives digital inputs from the pattern selector switch 20 and enables the quad former subsystem 42 when either the GRAY QUAD or the COLOR QUAD pattern is selected. At all other times latch 60 and flip-flop 61 are held in a quiescent state with "1's" appearing at the $\overline{Q}$ outputs of the latch and the flop-flop.

Line splitter 60 is a conventional asynchronous latch that includes NAND gates 62 and 63. This latch is reset upon receipt of each horizontal retrace blanking pulse as it arrives at the input of NOT gate 64. The Q output of the latch is in the "0" state during the first half of the line-scanning interval. NAND gate 65 receives inputs from the 2×chroma-to-line frequency counter subsystem 37. When the count indicates that the T.V. scanning beam is in the center of the screen from left to right (midway between retrace blanking pulses), the output of NAND gate 65 charges state from a "1" to a "0" level causing the Q output of the latch to transfer from a "0" to a "1" level at the center of the T.V. screen and to remain at the "1" level for the scanning of the right half of the line. This action repeats for each scanning line.

The action of the field splitter flip-flop 61 is essentially like that of the line splitter latch except it is reset ($\overline{Q}$ transferred to the "1" state) by the vertical sync pulse and is enabled to set (transfer of $\overline{Q}$ to the "0" state) in the center of the field by the output of AND gate 66. The actual transfer of $\overline{Q}$ to the "0" state is synchronized to the line-scanning by the horizontal retrace blanking pulse at the clock input to the field splitter. This synchronization is required in an interlaced system since on alternate fields the center of the field scanning occurs in the center of a line causing a displeasing appearance.

It can be observed that the field splitter is actually another latch. If it is used in a non-interlaced generator, it can be asynchronous; whereas, if it is used in a generator that produces interlaced scanning, it must be synchronized to the line-scanning circuits. The outputs of the line splitter and field splitter are employed with a binary weighting of one and two, respectively, in both the color preselect multiplexer and the weighted video multiplexer to produce the GRAY QUAD and the COLOR QUAD patterns. Note that the four binary combinations (0, 1, 2, and 3) suffice to define the four quadrants of the T.V. screen for the purposes of producing four shades of gray or four colors as shown in FIGS. 8 and 9. The unit weighting of the line splitter and the double weighting of the field splitter outputs, respectively, could be reversed if expedient.

Referring again to FIG. 3, the vertical lines generator 68 and the horizontal lines generator 69, each generate two sets of lines. The (A) set of vertical lines consists of 10, vertical lines equally spaced throughout the visible portion of the T.V. screen. The (B) set of vertical lines is generated with a 15, degree offset so that they are accurately centered between the (A) set. The same type of interspacing is used in generating the (A) and (B) sets of horizontal lines. The (A) set of vertical and horizontal lines is not actually brought out to the T.V. screen as a crosshatch. Instead, their intersections are used to produce dots that are accurately centered within the squares of the crosshatch produced by the (B) set of vertical and horizontal lines. The DOTS generator 71 and the HATCHDOTS generator 72 are shown in FIG. 3, but the subsystem 50 is set forth in greater detail in FIG. 6.

Referring to FIG. 6, it can be seen that outputs from the countdown circuits that produce the line and field scanning synchronizing signals are also used as inputs to the subsystem that produces the convergence patterns. A plurality of digital signals which are frequency and phase correlated with the line and field scanning are thus supplied as inputs to gates 74 through 82. AND gates 74 and 75, respectively, produce the vertical lines (A) and horizontal lines (A) patterns. Notice that these patterns are not displayed on the T.V. screen in the preferred embodiment of the invention, but could be if they were supplied to the video multiplexer and two additional pattern selections were added to the pattern selector switch 20. The vertical and horizontal lines functions (not actual patterns) are supplied to NAND gate 84 to produce an array of 100 dots which correspond with the 100 intersections of these vertical and horizontal lines functions. The NOT (inverted) sense is used for these dots since that is the sense required for causing a white dot or other white pattern element to appear on the black T.V. screen background.

AND gates 76 through 80 produce outputs which enable certain columns and rows of dots plus the center dot to be displayed as the dots portion of the HATCHDOTS patterns as shown in FIG. 10. The outputs of all these gates are supplied through OR gate 85 to NAND gate 86. The 100 dots output through NOT gate 87 is also supplied as an input to NAND gate 86. The output of NAND gate 86 is therefore an array of inverted (white) dots which pass through AND gate 88 to become part of the HATCHDOTS pattern.

The vertical lines (B) and horizontal lines (B) functions produced by NAND gates 81 and 82 respectively, are OR'ed together, in a negative sense, to produce the 10×10 crosshatch pattern at the output of AND gate 89. The actual use of this pattern as a crosshatch on the T.V. screen is optional, but it is generated as an interim function so that it can be OR'ed in a negative sense, with the frame and center dots output of NAND gate 86, to produce the HATCHDOTS pattern output resulting in the HATCHDOTS pattern as shown in FIG. 10. The HATCHDOTS pattern is a composite convergence pattern, and, as shown in FIG. 10, has a single center dot, a crosshatch, and a frame of dots pattern. The pattern is useful for size, linearity, centering, and pincushion checks and/or adjustments.

It might be noted that, if there is no requirement for displaying the crosshatch pattern, AND gates 88 and 89 can be combined into a single three-input AND gate, but are shown as two separate gates in FIG. 6 for simplicity of understanding. Other hardware simplifications could be achieved by combining certain of these gates with other subsystems, if desired.

Referring again to FIG. 3, the video multiplexing subsystem which includes weighted video multiplexer 45 and OR gates 91, 92, and 93 can be seen in relationship to their interfaces which include most of the subsystems in the generator. Referring to FIG. 7 for increased detail, it can be seen that the weighted video multiplexer 45 receives inputs from the pattern selector switch 20, which with their 1, 2, 4 binary weighting are more than sufficient to address the six pairs of inputs from the various subsystems. When a pair of X and Y inputs is addressed, the signals present at these inputs appear at $Q_x$ and $Q_y$, respectively. During the scanning of the visible portion of the T.V. screen (no blanking or sync signals), the $Q_x$ and $Q_y$ outputs pass through OR gates 91 and 92, respectively, and appear at the outputs of these gates as unit-weighted video (A) and double-weighted video. These and the unit-weighted video (B) output are later combined in a weighted summing network to produce five levels of video signal in the proportions indicated in a T.V. TRUTH TABLE as follows:

TABLE II

| T.V. VIDEO TRUTH TABLE | |
|---|---|
| 0 | White |
| 1 | Light Gray |
| 2 | Dark Gray |
| 3 | Black |
| 4 | Sync |

If a COLOR BARS pattern is selected, the "1" at the double-weighted $Y_0$ input and the square wave at the unit-weighted $X_0$ input produce a video output that alternates between dark gray (2) and black (3). Other circuitry causes chroma signals to be produced in synchronism with the dark gray luminance pedestals thus produced.

As described previously, if a primary color is being produced, which includes three quadrants of the COLOR QUAD pattern, this is indicated by a "1" appearing at $X_2$. With "1's" thus appearing at both inputs, a black (3) level background is produced. During scanning of the lower left quadrant of the COLOR QUAD pattern, the primary color indicator is a "0" causing the light gray (1) level to be produced.

With the GRAY QUAD pattern selected, the outputs of the quad former unit 42 are selected. The $X_2$ input transfers from a "1" to a "0" level in the center of each line and the $Y_2$ input transfers from a "1" to a "0" in the center of each field (in synchronism with the beginning of the next line). This causes four luminance levels, white, light gray, dark gray, and black to occupy their respective quadrants of the T.V. screen as illustrated in FIG. 9. The GRAY QUAD pattern illustrated in FIG. 9 is useful in providing a panoramic view of high, medium and low light for checking and adjusting gray scale tracking. The pattern is also useful in conjunction with calibrated RF output for checking receiver sensitivity, as well as providing a check of 60 Hz video response and a convenient check of yoke polarity.

Referring again to FIG. 7, with the 3.58 MONITOR or VECTOR pattern selected, both of the selected inputs are "1's" causing a black level background to be produced.

With HATCHDOTS or DOTS selected, the respective X and Y inputs are both "1's" (black level) when background areas of these convergence patterns are being scanned and both inputs transfer to the "0" level when white pattern elements are being generated.

When either of the retrace blanking signals is present at the respective inputs of OR gates 91 and 92, the black level (3) is produced. These signals override the outputs of the weighted video multiplexer. When either of the synchronizing signals is present at a respective input of OR gate 93, the output of this OR gate transfers to the "1" level. Since synchronizing signals always occur during a respective retrace blanking interval (black level already present), the blacker-than-black (sync) level is caused to be produced. The sync signals have a total video weighting of 4.

Referring now to FIG. 4, the composite chroma and three weighted video inputs are shown at the left of the diagram. The composite chroma is supplied from the CHROMA control 22, and the weighted video inputs are supplied by the video multiplexer subsystem. Four resistors, 95, 96, 97 and 98, are used to sum these inputs into a composite video signal with proper weighting. To this end, resistors 95 and 97 each have a resistance value, $R_1$, and 96 has a resistance of one-half this value. Since all three of these resistors are supplied digital (nominally equal amplitude) input signals, the composite video signal thus supplied to the RF modulator 100, which receives an input from RF oscillator 101, is caused to have the proper weighting factors per the "T.V. VIDEO TRUTH TABLE" as set forth hereinabove. The resistance value of $R_c$ (resistor 98) is chosen to provide the proper level of chroma signal in the composite video output.

The video polarity control subsystem 103 consists of EXCLUSIVE OR gates 104, 105, and 106, plus selector switch 107. In the preferred embodiment of the invention, this selector switch is ganged with the CHROMA LEVEL control 22. When the POLARITY SELECT switch 107 is pushed in (open), the "1" state exists on the respective control inputs to the three EXCLUSIVE OR gates 104 through 106 causing them to invert their inputs. The digital inputs to the EXCLUSIVE OR gates are the positive "1" level for producing the sync signals as required by the RF modulator. Since the EXCLUSIVE OR gates invert their signal inputs when their control inputs are at the "1" level, the outputs of these EXCLUSIVE OR gates can be seen to be appropriated for producing a negative sync video signal under the stated conditions. With the VIDEO POLARITY SELECT switch in the "pulled" (closed) condition, the EXCLUSIVE OR gates do not invert their signal inputs, and a video signal with positive sync polarity is produced.

The video and chroma output summing junction consists of resistors 109, 110, 111 and 112. Their weighted summing action is the same as that for the previously discussed summing junction that supplies the input to the RF modulator 100, except that lower resistance values are used in order to produce a low impedance video output with the proper characteristics for driving a 75 ohm coaxial line. Capacitive output coupling (not shown) is employed in the preferred embodiment of the invention.

Figure 11:
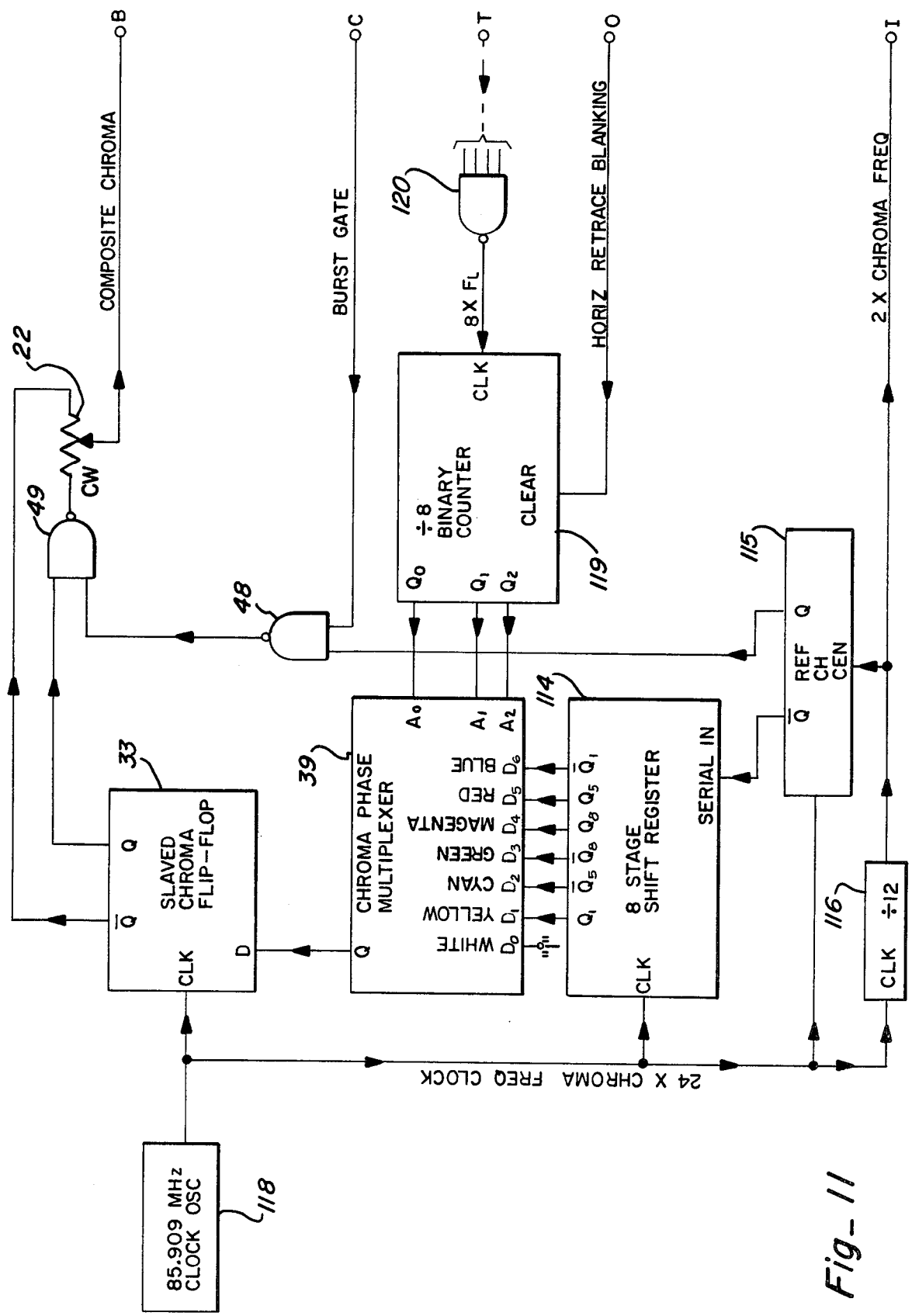
FIG. 11 is a functional block diagram relating to an alternate embodiment of this invention for producing an NSTC type color bar pattern.

As shown in the alternate embodiment of FIG. 11, chroma phase angles can also be produced in increments of 360/N degrees by the use of an N-stage shift register (shown as an 8 stage shift register 114 in FIG. 11), if such a shift register is supplied a chroma frequency serial input and clock at N times the chroma frequency. As shown in FIG. 11, shift register 114 is supplied a clock input from the 24×chroma frequency clock input, with the serial input being supplied from the $\overline{Q}$ output of reference chroma generator 115, which generator receives an input from divide-by-twelve (÷12) circuit 116.

The outputs fro shift register 114 are coupled to chroma phase multiplexer 39, the Q output of which is coupled to slaved chroma flip-flop 33. The clock input to flip-flop 33 is supplied from an 85.909 MHz clock oscillator 118 (which also supplies the 24×chroma frequency clock output), and the Q output of reference generator 115 is coupled to NAND gate 48 which is connected with NAND gate 49 in the same manner as described hereinabove in connection with FIG. 2.

The $A_0$, $A_1$, and $A_2$ inputs to multiplexer 39 are coupled from the $Q_0$, $Q_1$, and $Q_2$ outputs from divide-by-eight binary counter 119 which receives a clock input through AND gate 120 as shown in FIG. 11.

A tabulation of the chroma phase error for the embodiment as illustrated in FIG. 11 is as follows:

TABLE III

| CHROMA PHASE ERROR TABULATION | | | |
| --- | --- | --- | --- |
| Color | NTSC | Actual | Errors |
| White | — | — | — |
| Yellow | 12° | 15° | +3° |
| Cyan | 256.5° | 255° | −1.5° |
| Green | 299.9° | 300° | +0.1° |
| Magenta | 119.9° | 120° | +0.1° |
| Red | 76.5° | 75° | −1.5° |
| Blue | 192° | 195° | +3° |

The embodiment of FIG. 11 can be used to produce an NTSC type color bar pattern generator that is more accurate and lower in cost than any units known to have been produced, and a generator thus implemented is completely free of the usual delay lines and phase adjustments. If so utilized, a staircase of illuminates, as is well known in the art, would be included.

What is claimed is:

1. A pattern generating system for servicing an electronic unit having an image display, said system comprising:
   synchronizing signal generating means;
   reference signal generating means providing a non-color input;
   signal defining means including multiplexer means connected with said synchronizing signal generating means and reference signal generating means, said signal defining means producing a predetermined multiplexed output; and
   signal processing means connected to receive said multiplexed output from said signal defining means, said signal processing means including means responsive to said multiplexed output providing a system output signal that causes a GRAY QUAD test pattern to be produced by quadrants on an image display of an electronic unit connected with said system for servicing with each of said quadrants capable of being of a different shade of gray with respect to other quadrants.

2. A pattern generating system for servicing an electronic unit having an image display, said system comprising:
   synchronizing signal generating means;
   reference signal generating means including a chroma generator;
   signal defining means including multiplexer means that includes a chroma phase multiplexer connected with said chroma generator with said multiplexer means being connected with said synchronizing signal generating means and said reference signal generating means, and said signal defining means producing a predetermined multiplexed output; and
   signal processing means including combining means connected with said chroma phase multiplexer and receiving said multiplexed output from said signal defining means and responsive thereto providing a composite chroma output that causes a predetermined pattern to be displayed on an image display of an electronic unit connected with said system for servicing.

3. The pattern generating system of claim 2 wherein said combining means includes color burst receiving means for receiving a color burst, a flip-flop connected with said chroma phase multiplexer, a logic gate for receiving a color burst from said color burst receiving means, and a signal proportioning device connected with said flip-flop and said logic gate whereby color from said chroma phase multiplexer can be mixed with a received color burst.

4. The pattern generating system of claim 3 wherein said signal proportioning device is a potentiometer one end of which is connected to said flip-flop and the other end of which is connected with said logic gate.

5. The pattern generating system of claim 2 wherein said signal defining means includes quad forming means connected with said chroma phase multiplexer, and wherein said combining means includes a flip-flop connected with said chroma phase multiplexer whereby a plurality of chroma signals are provided by said signal processing means having predetermined phase relationships with respect to one another.

6. The pattern generating system of claim 5 wherein said multiplexers and said flip-flop are digital, and wherein said flip-flop is connected with said synchronizing means to receive an input signal therefrom at N times the chroma frequency of the input signal from said chroma phase multiplexer so as to generate phase differences at the chroma frequency consisting of a multiple, including 1, of 1/N×360 degrees.

7. The pattern generating system of claim 5 wherein said multiplexed means includes a color preselect multiplexer that is caused to select a plurality of colors so that said produced plurality of chroma signals each includes a different predetermined color, and wherein said quad forming means causes said plurality of chroma signals to be quadrant oriented to thereby produce on a connected image display a COLOR QUAD pattern wherein said different predetermined colors are displayed at separate quadrants of said image display.

8. The pattern generating system of claim 7 wherein said color preselect multiplexer selects primary colors, and wherein said quad forming means causes said primary colors to be displayed as a part of said COLOR QUAD pattern.

9. The pattern generating system of claim 7 wherein both primary and non-primary colors are displayed as part of said COLOR QUAD pattern.

10. The pattern generating system of claim 7 wherein said system includes means for supplying a non-color input to said chroma phase multiplexer whereby at least one of said quadrants of said image display is caused to have at least one shade of gray.

11. A pattern generating system for servicing an electronic unit having an image display, said system comprising:
synchronizing signal generating means;
reference signal generating means including HATCHDOTS generating means;
signal defining means including multiplexer means connected with said synchronizing signal generating means and said reference signal generating means and receiving the output from said HATCHDOTS generating means and responsive thereto providing a HATCHDOTS output; and
signal processing means connected to receive said HATCHDOTS output from said signal defining means and responsive thereto providing a system output signal that causes a HATCHDOTS pattern to be displayed on an image display of an electronic unit connected with said system for servicing.

12. The pattern generating system of claim 11 wherein said reference signal generating means includes a DOT generating means and a CROSSHATCH generating means so that said produced HATCHDOTS pattern includes a frame of dots, a center dot, and a crosshatch with each of said dots being centered within a different rectangle of said crosshatch.

13. A pattern generating system for servicing an electronic unit having an image display, said system comprising:
synchronizing signal generating means;
reference signal generating means;
signal defining means including multiplexer means connected with said synchronizing signal generating means and said reference signal generating means, said signal defining means producing a predetermined multiplexed output; and
signal processing means including signal combining means and digital polarity determining means connected to receive said multiplexed output from said signal defining means and providing digital outputs of predetermined polarity to said combining means, said signal combining means combining said digital outputs into an analog signal that causes a predetermined pattern to be displayed on an image display of an electronics unit connected with said system for servicing.

14. The pattern generating system of claim 13 wherein said video polarity determining means includes a plurality of EXCLUSIVE OR gates and switch means for selecting the desired polarity.

15. A pattern generating system for servicing an electronic unit having an image display, said system comprising:
synchronizing signal generating means;
output trigger signal means connected with said synchronizing signal generating means, said output trigger signal means included means for providing an output at one-half the line scanning frequency;
reference signal generating means;
signal defining means including multiplexer means connected with said synchronizing signal generating means and said reference signal generating means, said signal defining means producing a predetermined multiplexed output; and
signal processing means connected to receive said multiplexed output from said signal defining means and responsive thereto providing a system output signal that causes a predetermined pattern to be displayed on an image display of an electronic unit connected with said system for servicing.

16. A pattern generating system for servicing an electronic unit having an image display, said system comprising:
synchronizing signal generating means;
reference signal generating means;
signal defining means including multiplexer means connected with said synchronizing signal generating means and said reference signal generating means, said signal defining means producing a predetermined multiplexed output; and
signal processing means including color bar forming means connected to said synchronizing signal generating means and having a divide-by-eight binary counter connected with said multiplexer means and an eight stage shift register receiving an output from said reference signal generating means and producing a plurality of outputs that are coupled to said multiplexer means whereby a system output signal is produced that causes an NTSC type color bar pattern to be displayed on an image display of a unit connected with said system for servicing.

17. A pattern generating system for servicing a unit having an electronic image display, said system comprising:
synchronizing signal generating means;
reference signal generating means;
signal defining means connected with said synchronizing signal generating means and said reference signal generating means and providing pattern information outputs, said signal defining means including QUAD forming means causing said outputs produced by said pattern generating means to have a predetermined orientation with respect to the quadrants of an image display of an electronic unit to be serviced; and
output signal producing means connected to receive said outputs from said pattern generating means and responsive thereto providing output signals which when coupled to said image display of said electronic unit to be services causes a display by predetermined quadrants on said image display.

18. The pattern generating system of claim 17 wherein said QUAD forming means includes line-splitting means and field-splitting means.

19. The pattern generating system of claim 18 wherein said signal defining means includes multiplexer means connected to receive the outputs from said line-splitting means and said field-splitting means.

20. The pattern generating system of claim 19 wherein said multiplexer means includes a chroma phase multiplexer and wherein said reference signal generating means includes a reference chroma generator connected with said color phase multiplexer.

21. The pattern generating system of claim 17 wherein said output signal producing means includes signal combining means, said signal combining means including flip-flop means, logic gate means for receiving color burst, and adjustable signal select means.

22. The pattern generating system of claim 21 wherein said adjustable signal select means includes a potentiometer different sides of which are connected across the outputs of said flip-flop means with said logic gate means being connected between one of said outputs and one side of said potentiometer.

23. A pattern generating system for servicing an electronic unit having an image display, said system comprising:
   synchronizing signal generating means;
   HATCHDOTS generating means; and
   signal combining means connected to receive the output from said HATCHDOTS generating means and said synchronizing signal generating means, said signal combining means producing outputs causing a HATCHDOTS pattern to be displayed on the image display of an electronic unit connected with said system for servicing.

24. The pattern generating system of claim 23 wherein said system includes DOT generating means and CROSSHATCH generating means connected with said signal combining means whereby said produced HATCHDOT pattern consists of a rectangular frame of dots, a center dot, and a crosshatch with each dot being centered within a surrounding rectangle of a crosshatch.

25. A pattern generating system for servicing a T.V. receiver having an image display tube, said system comprising:
   synchronizing signal generating means;
   reference signal generating means;
   first signal defining means including first multiplexer means connected with said reference signal generating means, and QUAD forming means connected with said synchronizing signal generating means and said first multiplexer means, said first multiplexer means providing outputs each of which has a predetermined orientation with respect to a display on the image display tube of a T.V. receiver connected with said receiver;
   signal combining means connected with said synchronizing signal generating means and said first multiplexer means and providing a composite output signal indicative of a first predetermined pattern;
   second signal defining means including second multiplexer means connected with said synchronizing signal generating means and said reference signal generating means for producing an output indicative of a second predetermined output different from that of said first predetermined output;
   output means connected with said first and second signal defining means for providing output patterns from said system; and
   selecting means for selecting the pattern to be provided at said output means.

26. The pattern generating system of claim 25 wherein said reference signal generating means includes a chroma generator and a HATCHDOTS generator, and wherein said first predetermined output is displayed by quadrants on the image display tube of a T.V. receiver connected with said system with at least some of said quadrants being in color, and said second predetermined output is a HATCHDOTS pattern as displayed on said image display tube.

27. The pattern generating system of claim 26 wherein said reference signal generating means includes means for generating non-color outputs, and wherein said first predetermined output causes a display on said image display tube that includes only shades of gray in each different quadrant.

28. The pattern generating system of claim 25 wherein said reference signal generating means includes a DOTS generator and a CROSSHATCH generator whereby said second predetermined output includes a frame of dots, a center dot, and a crosshatch with each of said dots being centered in a different rectangle of said crosshatch.

29. A method for producing a pattern for use in servicing an electronic unit having an image display, said method comprising:
   generating signals indicative of different predetermined characteristics;
   separating the generated signals into different quadrants; and
   providing an output causing a QUAD pattern to be displayed on an image display of an electronic unit.

30. The method of claim 29 wherein said generated signals are indicative of different colors and wherein said different colors are displayed in different quadrants on said image display.

31. The method of claim 30 wherein said generated signals also include at least one shade of gray so that at least one of said displayed quadrants is non-color.

32. The method of claim 29 wherein said generated signals are indicative of shades of gray which are displayed by quadrants on said image display.

33. A method for producing a pattern for use in servicing an electronic unit having an image display, said method comprising:
   generating dual, in-phase outputs indicative of a primary color and providing said outputs to opposite ends of a chroma level control potentiometer;
   generating an output indicative of a color burst and multiplexing said output with one of said outputs indicative of a primary color at one end of said potentiometer; and
   combining said outputs at said potentiometer in order to vary the ratio of chroma-to-burst signals with said combination being a composite chroma output.

* * * * *

UNITED STATES PATENT AND TRADEMARK OFFICE
CERTIFICATE OF CORRECTION

PATENT NO. : 4,149,178
DATED : April 10, 1979
INVENTOR(S) : Earl M. Estes

It is certified that error appears in the above—identified patent and that said Letters Patent is hereby corrected as shown below:

Column 1, line 58, "mre" should read --- more ---.

Column 1, line 17, "equipment, should read --- equipments ---.

Column 2, line 1, "accordance" should read --- addition ---.

Column 7, line 56, "Q" (second occurrence) should read --- $\bar{Q}$ ---.

Column 8, line 41, "place" should read --- and ---.

Column 9, line 55, "charges" should read --- changes ---.

Column 10, line 23, "10," should read --- 10 ---.

Column 10, line 26, "15," should be --- 15 ---.

Column 11, line 43, "T.V. TRUTH TABLE" should read --- T.V. VIDEO TRUTH TABLE ---.

Column 12, line 38, "viedo" should read --- video ---.

Signed and Sealed this

Third Day of November 1981

[SEAL]

Attest:

GERALD J. MOSSINGHOFF

Attesting Officer     Commissioner of Patents and Trademarks